United States Patent

[11] 3,601,803

[72] Inventor Julian Richard Ullmann
Edgware, England
[21] Appl. No. 781,035
[22] Filed Dec. 4, 1968
[45] Patented Aug. 24, 1971
[73] Assignee Her Majesty's Postmaster General
London, England
[32] Priority Dec. 7, 1967
[33] Great Britain
[31] 55757/67

[54] PATTERN RECOGNITION PROCESSES AND APPARATUS
3 Claims, 10 Drawing Figs.

Figures 1, 1A:
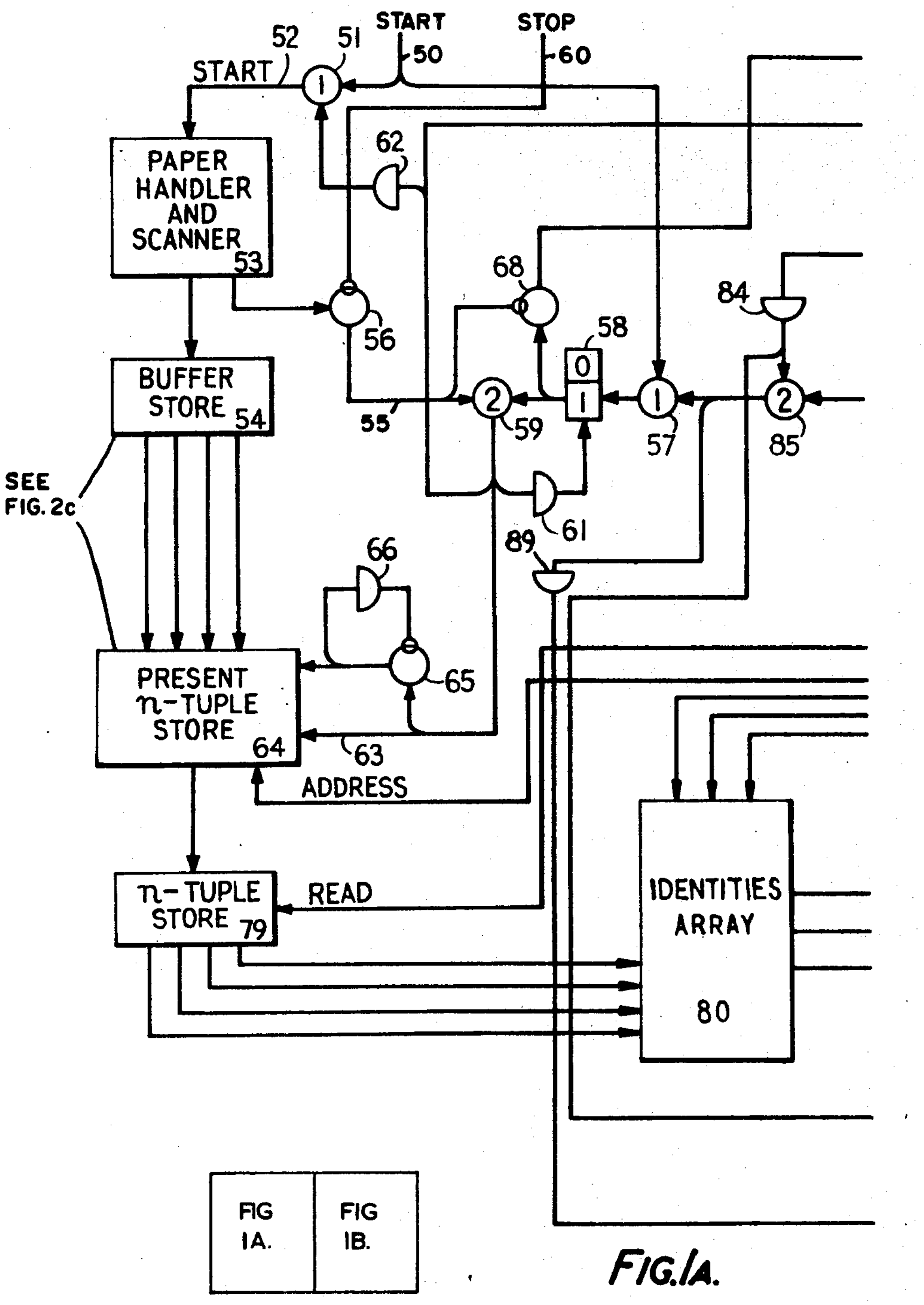

[52] U.S. Cl. ........ 340/146.3 R
[51] Int. Cl. ........ G06k 9/12
[50] Field of Search ........ 340/146.3

[56] References Cited

UNITED STATES PATENTS

| | | | |
|---|---|---|---|
| 3,271,739 | 9/1966 | Bonner | 340/146.3 |
| 3,333,248 | 7/1967 | Greenberg et al. | 340/146.3 |
| 3,446,950 | 5/1969 | King, Jr. et al. | 340/146.3 |

*Primary Examiner*—Maynard R. Wilbur
*Assistant Examiner*—William W. Cochran, II
*Attorney*—Hall and Houghton ABSTRACT: This specification describes a method of pattern recognition and apparatus for carrying out the method in which predetermined groups of $n$ pattern elements are extracted from an unknown pattern and these groups are compared with corresponding groups from patterns of known class to identify the unknown pattern. The invention lies in the manner of comparison of the groups of $n$ pattern elements and involves the examination of a group of elements from the unknown pattern to ascertain if there is a partition into parts of this group such that all of the parts belong to partitions into parts of the corresponding groups derived from the known patterns belonging to any one class. The parts of the partition of the group from the unknown pattern are also examined to ascertain whether they belong to a set of parts, each of which is the only part belonging to partitions of two different known patterns of the one class, such that these partitions are exclusively composed of parts obeying this last condition. It is decided that the group belongs to the one class if it satisfies both of the above conditions and the unknown pattern is identified as belonging to the one class if most of the groups derived from it belong to that class.

JULIAN R. ULLMANN
INVENTOR
BY [signature]
ATTORNEY

JULIAN R. ULLMANN
INVENTOR

BY Hall + Houghton
ATTORNEY

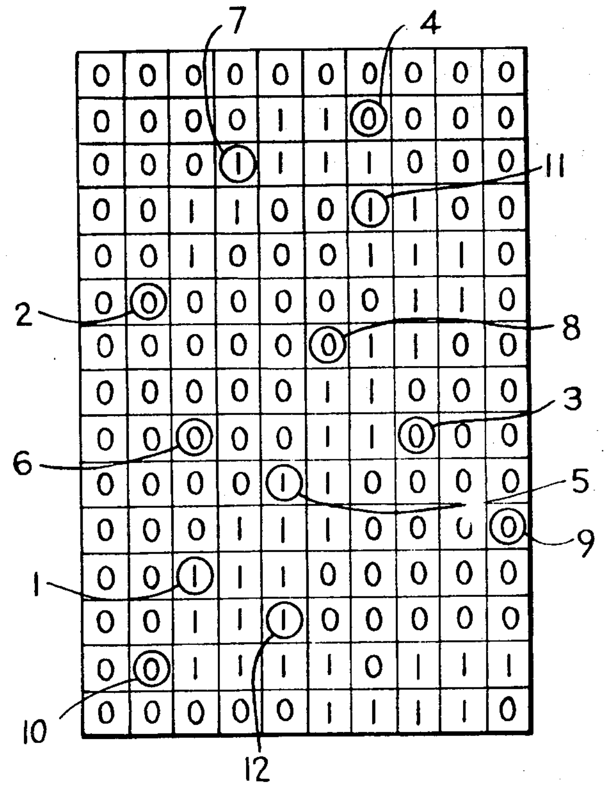
FIG. 2a
| n-TUPLE NUMBER | n-TUPLE PATTERN |
|---|---|
| 1 | 0 0 1 1 0 0 1 0 0 1 1 1 |
| 2 | 0 1 0 1 0 0 1 0 1 1 0 1 |
| ⋮ | ⋮ |
| 17 | 1 0 0 0 1 0 1 0 0 0 1 1 |
| ⋮ | ⋮ |
| 40 | 1 1 1 0 0 0 0 1 0 1 1 0 |
FIG. 2b
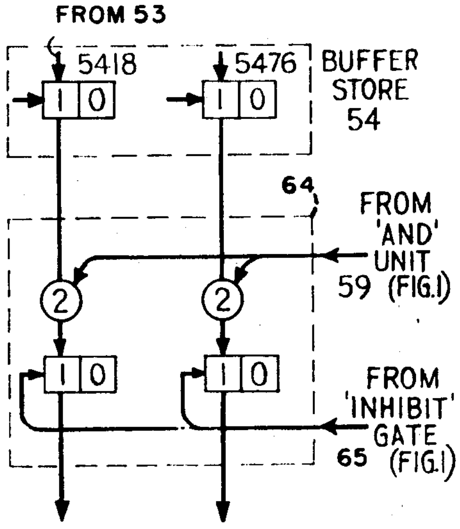
FIG. 2c
JULIAN R. ULLMANN,
INVENTOR
BY Hall + Houghton
ATTORNEY INVENTOR
JULIAN R. ULLMANN
BY Hall + Houghton
ATTORNEY

JULIAN R. ULLMANN
INVENTOR

BY Hall & Houghton
ATTORNEY

C BOX

JULIAN R. ULLMANN,
INVENTOR

BY [signature]
ATTORNEY

PATTERN RECOGNITION PROCESSES AND APPARATUS

This invention relates to pattern recognition processes and apparatus.

It has been proposed to employ in pattern recognition processes techniques based upon the identification of intuitively or automatically chosen features. Recognition is thus based upon the presence of one or more of the chosen features which are identified independently and the identifications are subsequently combined to effect the recognition of the entire pattern. However, the different features of a pattern are to some extent interdependent, and the separate identification of the features ignores the information provided by this interdependence, which information would be, in many cases, retained, at least partially, by a different division of the pattern into features.

An object of the invention is to provide an improved pattern recognition apparatus in which the above disadvantage is at least partly overcome.

According to the one aspect of the invention there is provided pattern recognition apparatus in which a comparison is effected relating an input pattern with patterns of known class thereby to identify the input pattern, the apparatus including storage means for representations of the patterns of known class, logical devices indicating the identity or nonidentity of corresponding elements of the input pattern taken with each of the patterns of known class, other logical devices which are activated only when there is a subdivision into parts, at least some of which include a plurality of elements, of the input pattern such that all parts of the input pattern are identical with corresponding parts of known pattern belonging to one class, the parts of the known patterns also belonging to a restricted set of parts out of which the known patterns are exclusively composed, and means responsive to the logical devices to indicate that one class as the class to which the input pattern belongs.

If for each piece in a jigsaw puzzle there are several alternative pieces having the same shape but bearing different patterns, it is possible to combine and recombine these pieces to make up a set of different complete puzzle pictures or patterns. A set of patterns made up in this way will be referred to as a "recombination set." Given a sufficiently large number of example members of a recombination set, it is possible to determine whether or not any further pattern belongs to this set, by means of a computational technique incorporated in the present invention.

Patterns to be recognized are binarised onto an array of binary pattern element locations. An *n*-tuple is a set of *n* pattern element locations, and the present system works with a plurality of randomly chosen *n*-tuples. As in the well-known recognition method of Bledsoe and Browning, the present system is "conditioned" or "trained" by means of sets of example patterns from all the classes to be recognized. These sets of examples are commonly known as "training sets." Let Q be the set comprising the first $\Phi$ patterns on the $x^{th}$ *n*-tuple which occur in the $r^{th}$ class training set, where $\Phi$ is some carefully chosen number.

When a character or member of a recognition class P is to be recognized the *n*-tuple patterns are extracted from it. Assume that the patterns on the *X*th *n*-tuple is $\underline{P_{x\psi}}$. Then, the recognition machine tests $\underline{P_{x\psi}}$ to determine whether it belongs to the same recombination set as the patterns belonging to $Q_{xr}$. If, for any character or recognition class, *s* for example, the number of values of *x* for which the test decides that $\underline{P_{x\psi}}$ and $Q_{xs}$ belong to the same recombination set is greater than for any other character or class, the P is recognized as character *s* or as a member of recognition class *s*. Otherwise P is rejected.

Figure 1B:
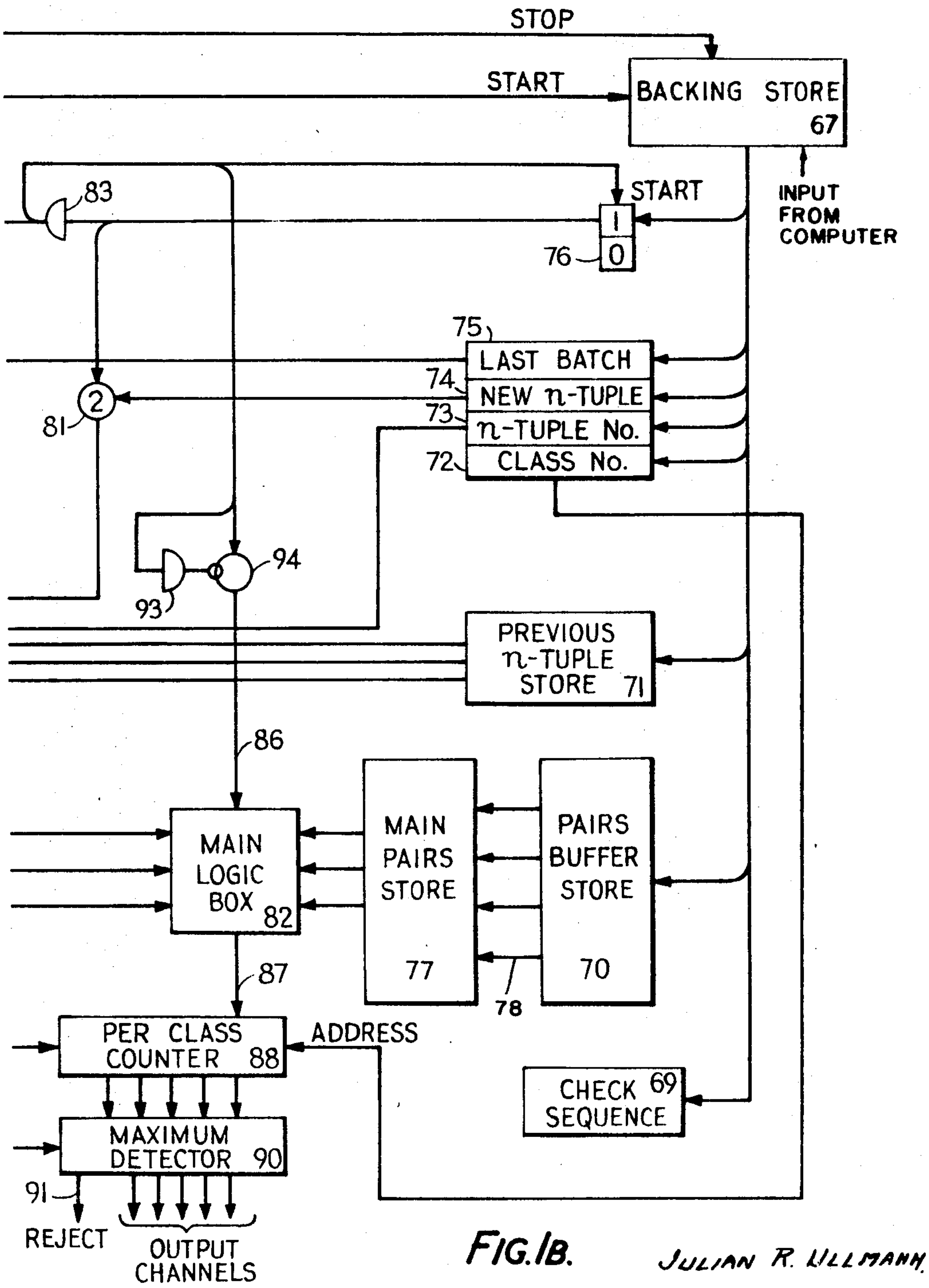

By way of example only a recognition machine embodying the invention will now be described in greater detail with reference to the accompanying drawings of which:

FIGS 1A and 1B together form a logic drawing showing the operation.

Figure 3:
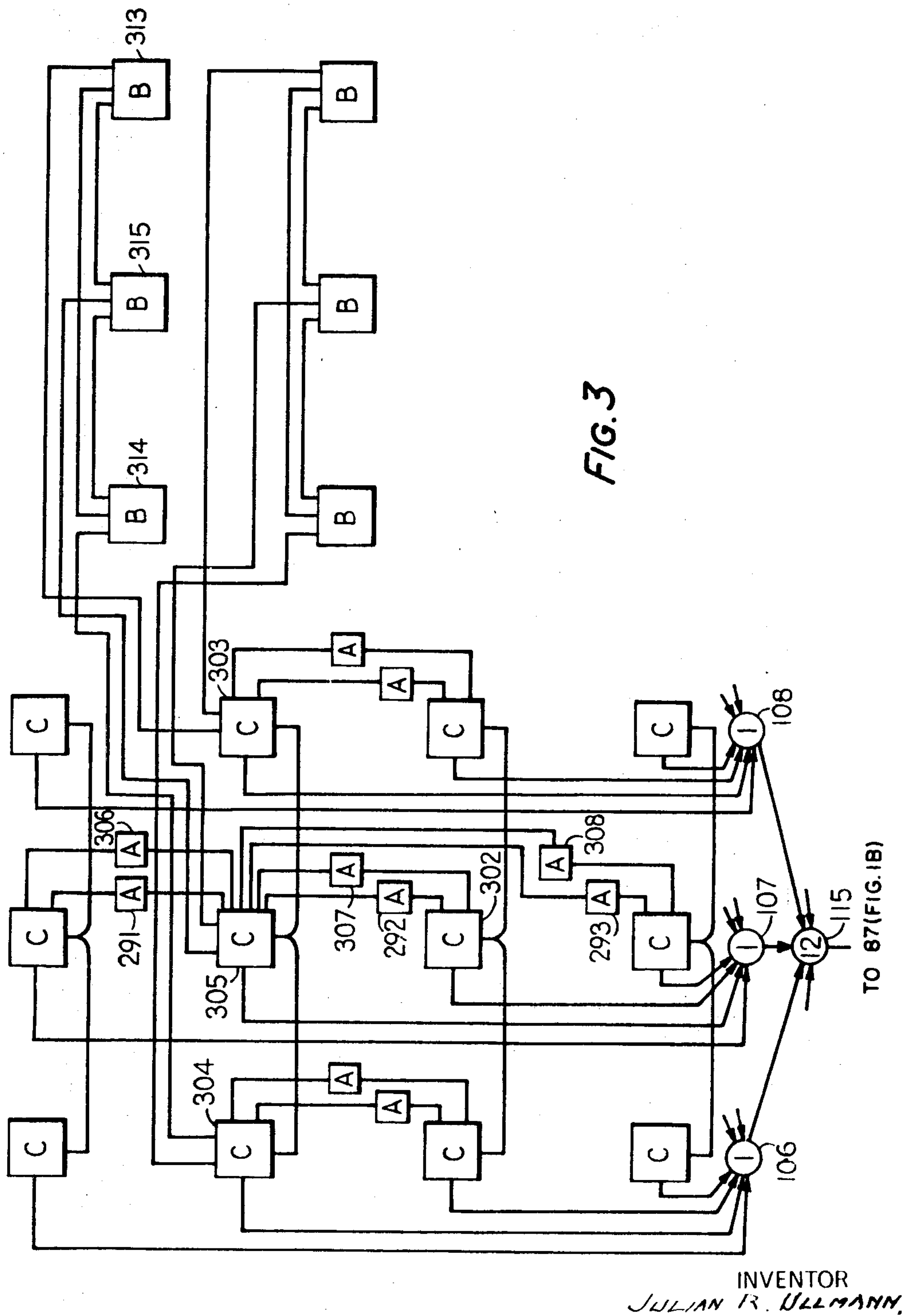
Figure 4A:
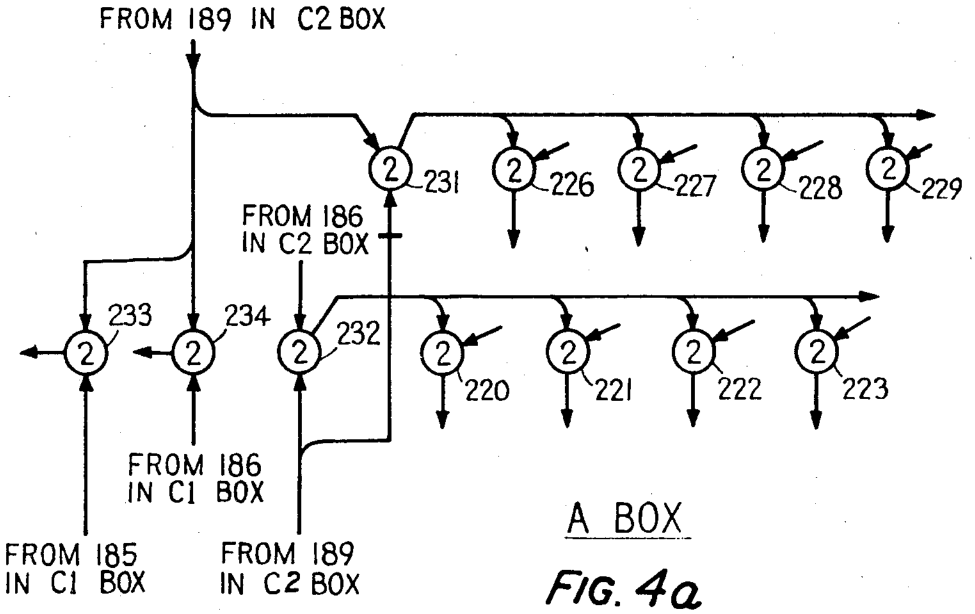

FIG. 2*a* is an explanatory drawing showing the derivation of a set of pattern locations, FIG. 2*b* is an explanatory table, FIG. 2C shows the construction of the buffer store and present *n*-tuple store of FIG. 1A, FIG. 3 is a logic drawing showing detail of part of FIG. 1 and, FIGS. 4*a*, *b* and *c* are logic drawings showing further details of parts of FIG. 1.

The embodiment to be described is suitable for use in the recognition of characters of alphanumeric form.

The character to be recognized is projected on to a rectangular matrix of photoelectric cells in a unit referred to below as a paper handler and scanner unit. The output of the matrix is stored and processed in a manner now to be described in order to recognize the character.

When a 'start' button 50 (FIG. 1) is pressed by an operator an activating signal passes via an OR gate 51 and a channel 52 to the paper handler and scanner shown as block 53. The paper handler positions the character to be recognized in the raster of the scanner, and the scanner reads and binarises the character into a buffer store 54 and then emits a 'ready' signal in a channel 55 via inhibit gate 56. The information stored in the buffer store 54 is a binarised version of the scanned character. Details of the paper handler and scanner 53 and buffer store 54 are not given because they are known.

When the 'start' button 50 is pressed, a toggle 58 is activated via OR gate 57, so that AND gate 59 is activated when the 'ready' signal is received in channel 55. The function of the inhibit gate 56 shown in channel 55 is to inhibit the 'ready' signal when the operator presses the stop button 60 to stop the recognition process. Activation of AND gate 59 causes activation of OR gate 51 after a short delay introduced by delay unit 62, and the signal in channel 52 causes the paper handler and scanner 53 to read the next character to be recognized into the buffer store 54. Activation of AND gate 59 also deactivates toggle 58 after a short delay introduced by delay unit 61. Furthermore, activation of AND gate 59 causes a signal to pass via channel 63 to the 'present *n*-tuples' store 64, and also to this store via inhibit gate 65, which emits a short pulse of a duration determined by delay unit 66.

In an example shown in FIG. 2*a*, the buffer store 54 is a 10×15 array of toggles, and 1's and 0's signify activation and nonactivation of corresponding toggles in buffer store 54 which in this example contains a binarised version of a FIG. '2' derived from the scanner 53. A set of *n* randomly chosen toggles in buffer store 54 will be referred to as an *n*-tuple, and the pattern of activation in an *n*-tuple will be referred to as an *n*-tuple pattern. A number, for example 40, of *n*-tuples, where for example *n*=12, is chosen randomly. In FIG. 2*a*, as an example, the 1's and 0's for toggles belonging to the 17th *n*-tuple are circled. In FIG. 2*b*, patterns on four of the 40 *n*-tuples are illustrated. For example, counting from left to right, the first digit in the 17th *n*-tuple is that in the circle labeled '1' in FIG. 2*a*, the second digit in the 17th *n*-tuple is that in the circle labeled '2' in FIG. 2*a*, and so on. Whatever the pattern in buffer store 54, the 4th digit in the pattern on the 17th *n*-tuple derived from that buffer store pattern is always the digit in the toggles in the second from top row and seventh from left column of buffer store 54, corresponding to circle 4 in FIG. 2*a*, and all other digits in this and all other *n*-tuples patterns are determined similarly.

Referring back to FIG. 1, the 'present *n*-tuples' store 64 thus consists of 40 rows of 12 toggles, one row corresponding to each of the 40 chosen *n*-tuples. Inhibit gate 65 is connected to all the toggles in store 64 so that when inhibit gate 65 is activated, all the toggles in store 64 are cleared (i.e. deactivated). Each toggle in store 64 is connected to one toggle in store 54, such that the set of toggles in store 54 which any row of toggles in store 64 is connected to, is, in fact, the *n*-tuple corresponding to that row. For example, the 4th toggle, labeled 644 in FIG. 2c, in the 17th of of store 64 is connected to the toggle labeled 5418 in FIG. 2c, in the second from top row and 7th from left column of buffer store 54. When a signal reaches AND gate 6441 from AND gate 59, toggle 644 is activated if toggle 5418 is activated. Although only one other toggle in store 54 and one in store 64 is shown in FIG. 2c, in fact all store 64 toggles are connected to store 54 toggles via AND gates in turn connected to AND gate 59, so that when AND gate 59 is opened, the 40 $n$-tuple patterns are read from the buffer store 54 to store 64 simultaneously. The delay introduced by delay unit 62 is sufficient to prevent the scanner 53 from reading into store 54 until the transfer from store 54 to store 64 is complete.

Backing store 67 is any known high capacity data storage device, preferably a disc file, but the following description, for the sake of specific example, is given in terms of magnetic tape.

When AND gate 59 is activated, the magnetic tape in store 67 is set in motion. This motion is stopped only when store 67 receives a signal from inhibit gate 68, which is activated whenever toggle 58 is activated and at the same time inhibit gate 56 is not activated. Data from store 67 is read initially into 'check sequence' device 69, which checks whether a certain identification sequence, which is an arbitrary string of bits, is present on the magnetic tape. The time taken to read the check sequence is greater than the time taken for parallel transfer of information from pairs buffer store 70 to main pairs store 77 described below. When the check sequence has been read, subsequent 12-bit numbers are read into successive rows of pairs buffer store 70, until all the rows of this store are filled, then into successive rows in 'previous $n$-tuple' store 71 until all are filled, then subsequent bits into successive 6-bit stores 72 and 73, and toggles 74, 75, 76, then into check sequence device 69, stores 70 and 71, and so on until store 67 receives a 'stop' signal from inhibit gate 68. Store 67, and the means by which store 67 reads into successive locations in successive stores are not described here in detail since they are known.

'Pairs buffer' store 70 consists of, for example 231 rows of 12 toggles. It is to be understood that the number 12 is merely an example of the number of toggles in the $n$-tuples with which this machine works. 'Main pairs' store 77 consists of toggles in 1:1 correspondence with those in store 70; and 1:1 corresponding toggles in stores 70 and 77 are connected in such a manner that a signal in channel 78 causes store 77 to be cleared and then the entire contents of store 70 transferred in parallel into store 77.

The $n$-tuple store 79 is a row of 12 toggles, connected to store 64 so that when toggle 74 and AND gate 81 are activated, an $n$-tuple pattern is read into store 79 from a row in store 64, the choice of the row in store 64 being determined by the 6-bit number in the store 73. The means by which the number in store 73 is decoded and used to select a row in store 64 is known and will not be described. Delay unit 83 introduces a delay sufficient for completion of data transfer from store 70 to store 77 and from store 64 to store 79.

The 'previous $n$-tuple pattern' store 71 consists of, for example, 22 rows each containing 12 toggles. Each of these toggles is connected to a 1:1 corresponding logical equivalence unit in 'identities' array 80. Thus array 80 comprises in this example 22 rows of 12 equivalence units. An equivalence unit is a known binary device which in this case has one output channel and two input channels; and the output channel is activated if and only if either both of the input channels are activated or neither of the input channels is activated. The output channels from all the equivalence units in array 80 are connected into the logic box 82. One of the input channels to each equivalence unit in array 80 comes from the output of the 1:1 corresponding toggle in store 71. The other input channel to each equivalence unit in array 80 comes from the output of a toggle in store 79, this toggle being chosen according to the following rule. The 12 columns in array 80 correspond 1:1 to the 12 toggles in store 79, and to each equivalence unit in any column of array 80, one input channel comes from the corresponding toggle in store 79. For example, the output channel from the third from left toggle in store 79 is an input channel to every equivalence unit in the third from left column of array 80.

After the time delay introduced by delay unit 83, toggle 76 is deactivated, and by means of delay unit 93 and inhibit gate 94 a single short pulse is sent via channel 86 to the main logic box 82 which is described in detail below. The computation in the main logic box 82 is completed in a time less than the delay introduced by delay unit 84, which in turn is less than the time taken for reading from the backing store 67 into store 70. The output from main logic box 82 is a binary signal in channel 87, which is input to 'per class' counters 88.

The 'per class' counters are known counters, one assigned to each recognition class. The number in the 6-bit store 72 determines which counter of counters 88 the signal in channel 87 is counted into. Counting only takes place when counters 88 receive a signal from the output of delay unit 84. For example if the number in store 72 is 5, then when a signal is received from delay unit 84, the count in the fifth counter in counters 88 is increased by 1 if the signal in channel 87 is 1, and not changed if the signal in channel 87 is 0. Details of counters 88 and the selection (i.e. addressing) of a counter by the number in store 72 are not given since they are known.

When the 'last batch' toggle 75 is in the activated state and AND gate 85 is activated, after a time delay (sufficient for counting in counters 88) introduced by delay unit 89, a 'maximum detector' device 90 is triggered. Device 90 has one output channel corresponding to each counter 88 and thus to each recognition class. This device reads the counts in the counters in counters 88 and finds which counter contains the highest number, and activates the output channel corresponding to this counter. If more than one counter in counters 88 contains the highest number, device 90 activates its 'reject' output channel only. For example if the seventh counter in counters 88 contains the highest number, device 90 activates its seventh output channel. If, instead, the fifth and ninth counters in counters 88 both contain the number 31, and no other counter in counters 88 contains a higher number, then device 90 activates only its reject channel 91. After a short delay after giving output, device 90 sets to zero all the counters in counters 88. The details of device 90 and the clearing of counters 88 are not described since they are known. The output from device 90 is the recognition output from the whole machine. When AND gate 79 is activated the whole recognition process as described above starts again for the next character to be recognized. If there is no 'ready' signal in the channel 55 from paper handler scanner 53, AND gate 59 is not activated, and a signal via inhibit gate 68 stops the machine reading from backing store 67. This holdup continues until AND gate 59 receives a signal from inhibit gate 56.

The main logic box 82 is described in detail in terms of logic boxes A, B and C, some of which are shown in FIG. 3. The design of all A boxes is the same, as is that of all B boxes and that of all C boxes. Each equivalence unit in array 80 is connected to a 1:1 corresponding C box in main logic box 82 (FIG. 1), and the total number of C boxes is equal to the total number of equivalence units in array 80. Every C box is connected to input channel 86 of the main logic box 82. All C boxes in the same column have an output channel connected as an input channel to the same OR gate, for example OR gates 106, 107, 108 for the three incomplete columns shown in FIG. 3. These OR gates have their outputs connected as inputs to a single AND gate 115 (FIG. 3), of which the output channel is channel 87 (FIG. 1). There are many lateral interconnections between every pair of C boxes in the same row. By way of example it is specified that there are 12 C boxes per row, but it is to be understood that this number, the number of elements per $n$-tuple, which is the value of $n$, need not necessarily be 12.

Between every pair of C boxes in the same column there are two A boxes, both of which have outputs from both the C boxes. But each of the C boxes only receives output from one of the A boxes. A C box to which an A box sends output is called a C1 box for that A box, and a C box to which an A box sends no output is called a C2 box for that A box. For example, between C boxes 305 and 302 (FIG. 3), A box 307 is so connected that C box 305 is its C1 box and C box 302 is its C2 box; and A box 292 is so connected that C box 305 is its C2 box and C box 302 its C1 box. The 12 A boxes which have their C1 boxes in the same row and their C2 boxes in the same row will be referred to as "same-pair" A boxes. All same-pair A boxes are interconnected. If there are *r* rows of C boxes, the total number of A boxes is 2×12(*r*—1)/2). The following description is given in terms of *r*=22, by way of example, and in this case the number is 2×12×231, so there are 2×231 A boxes corresponding to each column of C boxes. When *r*=22, there are 22 rows in store 71, each of 12 toggles; and store 77 consists of 231 rows, each of 12 toggles.

Each C box is connected as the C2 box to 21 A boxes, and also via B boxes to a set of 21 toggles in store 77 which correspond 1:1 with these 21 A boxes. Thus there are altogether 12×231 B boxes, arranged so that all B boxes connected to C boxes in a given row and store 77 toggles in any given row themselves lie in the same row. B boxes in the same row will be referred to as "same-pair" B boxes. All same-pair B boxes are multiple interconnected. In FIG. 3 single connections are used to represent multiple connections as explained below.

The logical designs of A, B and C boxes are shown in FIGS. 4*a*, *b*, *c*, except that where logical units are repeated, only a few of them are shown.

A C box (FIG. 4*c*) contains 11 AND gates of which only four, 120, 121, 122, 123, are shown. In 1:1 correspondence with these are sets of OR gates 126, 127, 128, 129, etc., 180, 181, 182, 183, etc., 131, 132 133, 134, etc., and AND gates 170, 171, 172, 173, etc. Each of the 11 OR gates in any one of these sets corresponds uniquely to one of the columns in array 80, except that there is no OR gate corresponding to the column in which the C box itself is situated. By way of example, detailed interconnections between C box 305 (FIG. 3) and some of the A and B boxes are now described.

In A box 307 (FIG. 3) there are 11 AND gates 226, 227, 228, 229 etc. (FIG. 4*a*) in 1:1 correspondence with the 11 AND gates 120, 121, 122, 123 etc. in C box 305. The output of any given AND gate in the set 226, 227, 228, etc., is one of the inputs to the corresponding OR gates 180, 181, 182, etc., in C1 box 305. For example, the output of AND gate 228 in A box 307 is one of the inputs to OR gate 182 (FIG. 4*c*) in C box 305. The other inputs to OR gate 182 in C box 305 are from AND gates 182 in C box 305 and 228 in all other similarly connected A boxes; that is, to all A boxes in the same column as A box 307 which have C box 305 as their C1 box. One of the inputs to each of the AND gates 226, 227, 228, 229 in an A box is the output from AND gate 231 in that A box. The other input to AND gate 226 is from the AND gate 233 in the connected same-pair A box corresponding to AND gate 226, and AND gates 227, 228, 229 are connected up correspondingly, that is, to AND gate 233 in the corresponding A box.

In 1:1 correspondence with AND gates 226, 227, 228, etc. in an A box there is a set of 11 AND gates 220, 221, 222, 223, etc., each deriving one input from the output of the AND gate 232 in that A box. The other input to any one of the AND gates 220, 221, 222, 223, etc., is from the AND gate 232 in the corresponding same-pair A box. The output of AND gate 220 is one of the inputs to the corresponding OR gate 126 in the C1 box of that A box. Similarly the output from gage 221 goes to gate 121, from 222 to 122, etc. In an A box, AND gates 233, 234, 231 all derive one input from the output of OR gate 189 in the corresponding C2 box. The other input to AND gate 234 is from AND gate 186 in the connected C1 box. The other input to AND gate 231 s via an inverter from the output to AND gate 231 is via an inverter from the output of SR gate 189 in C2 box. The output of this OR gate 189 is also an input to AND gate 232 in the A box, to which the other input comes from AND gate 186 in the connected C2 box. The other input to AND gate 233 is from inverter 185 in the C1 box.

Figure 4B:
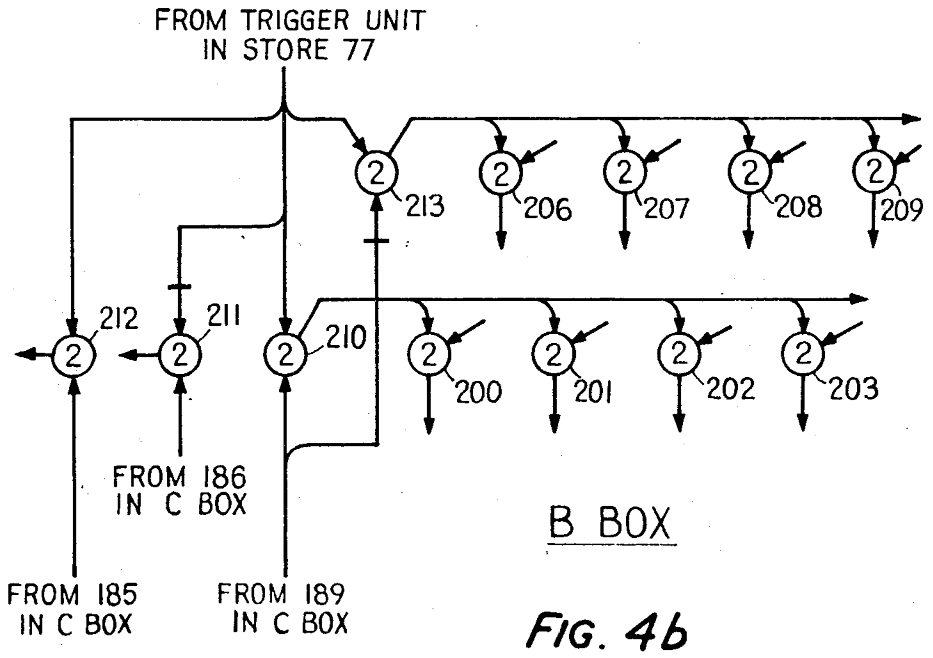

In a B box (FIG. 4*b*), there are 11 AND gates 206, 207, 208, 209, etc. in 1:1 correspondence with 11 AND gates 200, 201, 202, 203, etc., which in turn correspond 1:1 with the columns of C boxes except that there is no gate corresponding to the column in which the B box itself is situated. The output from each of the gages 200, 201, 202, etc. is connected to the corresponding OR gate in the set 131, 132, 133, in the connected C box, that is, to the OR gate corresponding to the column to which the AND gate itself corresponds. The AND gates 200, 201, 202, 203 each derive one input from AND gate 210 in the same B box and one from the AND gate 211 in the same-pair B box in the column to which the AND gate in the gates 200, 201, 202, 203, etc. corresponds.

The AND gates 206, 207, 208, 209, etc. each derive one input from AND gate 213, and the other input from AND gate 212 in the same-pair B box corresponding to the AND gate in set 206, 207, 208, etc. The output from each AND gate 206, 207, 208, etc., is an input to the corresponding OR gate 164, 165, 166, 167, etc., in the connected C box. AND gates 212, 210, 213, each derive one input from the store 77 toggles to which the B box is connected and AND gate 211 also derives one input from this toggle, but via an inverter. AND gate 210 derives its other input from OR gate 189 in the connected C box, and AND gate 213 also derives an input from this OR gate 189, but via an inverter. AND gate 211 derives one input from AND gate 186 in the connected C box, and AND gate 212 derives an input from inverter 185 in the connected C box.

In a C box, one of the inputs to AND gate 190 is from the 1:1 corresponding equivalence unit in array 80, and the other is from channel 86, the output from inhibit gage 94 (FIG. 1). The output from the 1:1 corresponding equivalence gate is also connected via a inverter 185 as an input to OR gate 187. OR gate 187 also has as inputs the outputs from the 11 AND gates 170, 171, 172, 173, etc. The output from AND gate 186 is fed to the connected A and B boxes as specified above. The threshold 12 AND gates 188 has as specified above. The threshold 12 AND gates 188 has as inputs the OR gate 189, the 11 AND gates 120, 121, 122, etc., in the C box and the OR gates 189 in the other 11 C boxes in the same row.

Figure 4C:
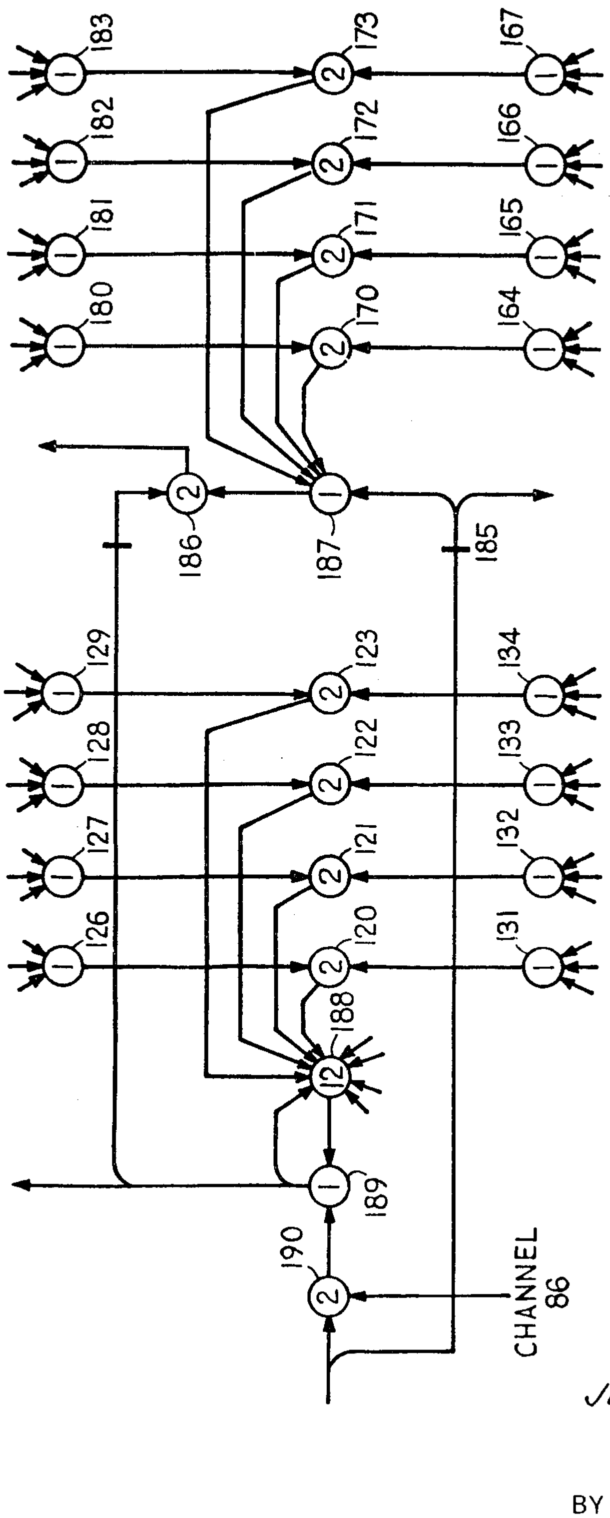

When AD gate 190 (FIG. 4*c* receives a signal from channel 86, and the corresponding equivalence unit is at that time activated then OR gate 189 is activated. After channel 86 has become deactivated, OR gate 189 only remains active if threshold 12 AND gate 188 is active, which depends on activation of logical units in A and B boxes as specified above. If an OR gate 189 ceases to be activated, this can, because of interconnections, cause other OR gates 189 to deactivate, which can cause further such gates to deactivate and so on. This chain of deactivation proceeds asynchronously after the termination of the channel 86 signal. This asynchronous computation rapidly and automatically terminates, in that there is no further asynchronous switching. the delay introduced by delay unit 84 (FIG. 1) is chosen to be longer than the sum of the maximum time the asynchronous computation takes to terminate and the delay introduced by delay unit 93.

The connections from C boxes to one nOR gate per column, e.g. 106, 107, 108, shown in FIG. 3 are in fact from the OR gates 189 in the C boxes. For example, activation of OR gate 108 signifies that the OR gate 189 in at least one of the C boxes in the right-hand column FIG. 3 is active. The output signal from delay unit 84 causes counting of the output from AND gate 115 (FIG. 3) via channel 87 (FIG. 1), into the counters 88 as specified above.

The working of this character recognition machine depends on the information stored in backing store 67. This information is prepared in advance by a digital computer. This information will now be specified in such terms that will allow one skilled in the art to program a computer to produce the requisite information.

For each of the recognition chasses a number of specimens are obtained, in the form in which characters appear in buffer store 54 (FIG. 1), and $n$-tuple patterns are extracted from them and stored in the computer. This can for example be accomplished by reading by known means from store 64 (FIG. 1) into the computer the $n$-tuple patterns from a pattern which has been scanned into buffer store 54. The number of character specimens from each recognition class is such that at least 22 different $n$-tuple patterns are obtained for each $n$-tuple, and any further $n$-tuple patterns, i.e. the 23rd, 24th etc., are discarded by the computer. In other words the computer stores the first 22 different $n$-tuple patterns off the (for example) 40 chosen $n$-tuples, obtained from specimens of the same recognition class, and repeats this for every recognition class.

For all $x$ from 1 to 40, and for all $y$ from 1 to Z, where Z is the number of recognition classes, let $Q_{xy}$ be the set of 22 different patterns for the $x^{th}$ $n$-tuple and $y^{th}$ recognition class. Using every $Q_{xy}$ in turn as data, the following computation is performed.

Let the $\Phi$ $n$-tuple patterns (in the above description $\Phi=22$ has been taken as an example) in $Q_{xy}$ be $P_1, P_2 \ldots P_\alpha, P_\beta, \ldots P_\phi$. For any $\alpha$ from 1 to $\Phi$ let $P_{1\alpha}, P_{2\alpha}, \ldots P_{i\alpha}, P_{j\alpha} \ldots P_{n\alpha}$ be the $n$ digits in $n$-tuple pattern P . (In the above description $n=12$ was taken by way of example). For any $\alpha$, $\beta$ in the range 1, 2, ... $\Phi$, such that $\alpha \neq \beta$, and for any $i$ in the range 1, 2, ... $n$, $i\alpha\beta$ is the (nonordered) digit pair $\{P_{i\alpha}, P_{i\beta}\}$.

Series of sets $D_o, D_1, \ldots D_t \ldots$, and $C_o, C_1, \ldots C_t, \ldots$ of digit pairs are defined by means of the following conditions:

$i\alpha\beta \epsilon A_o$ if and only if $P_i = P_i$ $i\alpha\beta \epsilon C_o$ if and only if $i\alpha\beta \notin D_0$ $i\alpha\beta \epsilon D_t$ if an only if $(i\alpha\beta \epsilon D_{t\,1\,1})$ $\&(j)((j\alpha\beta \epsilon D_{t\,1\,1})$ $v(j\alpha\beta \epsilon C_{t\,1})\&$.

$$(\exists\gamma)(\exists\delta)((\{j\alpha\gamma, j\beta\delta\} \subset D_{t-1})\&(\{i\alpha\gamma, i\beta\delta\} \subset C_{t-1}))).$$

$i\alpha\beta \epsilon C_t$ if and only if $$(i\alpha\beta \notin D_t)\&(\exists j)((j\alpha\beta \epsilon C_0)$$
$$\&(\exists\gamma)(\exists\gamma)(\{i\alpha\gamma, j\alpha\gamma, i\beta\delta, j\beta\delta\} \subset D_{t-1})).$$

The computer finds the members of the successive seats $A_o$, $C_o$, $D_1$, $C_1$, $D_2$, $C_2$, ... until it reaches the first member $D_w$ of this series such that $D_w = D_{w\,1\,1}$.

For each pair of $n$-tuple patterns $P_\alpha, P_\beta$ it is arranged that an $n$ bit computer word, called a $D_w$ word, contains 1's for all $i$ such that $i\alpha\beta \epsilon D_w$, and 0 for all other values of $i$. The computer first writes the check sequence (an arbitrary string of bits) on to the magnetic tape, and then writes the $\frac{1}{2}\Phi(\Phi-1)$ $n$ bit $D_w$ words on to the magnetic tape. Each of these words corresponds to a pair of $n$-tuple patterns belonging to $Q_{xy}$. Each of the rows in buffer store 70 (FIG. 1) also corresponds uniquely to a (nonordered) pair of patterns in store 71). The computer writes the $D_w$ words on to the tape in such order that they will be read into rows corresponding 1:1 with the pairs of patterns to which the $D_w$ words correspond. For example, if the ninth row in store 70 corresponds to the patterns in the second and sixth rows of store 71, then the $D_w$ word read into the ninth row in store 70 will correspond to the second and sixth $n$-tuple patterns in $Q_{xy}$, that is, to $\alpha=2$ and $\beta=6$, or $\alpha=6$ and $\beta=2$. Having written the $D_w$ words on to the tape, the computer writes the members of $Q_{xy}$ on to the tape in an order such that when read into store 71, successive rows will contain $P_1, P_2 \ldots P_\phi$.

The computer then writes on to the tape the value of $y$ as a 6-bit number. This number specifies the recognition class of $Q_{xy}$. Next the computer writes on to the tape the value of $x$ as a 6-digit number, which specifies which $n$-tuple $Q_{xy}$ comes from. Then the computer writes 3-bits on to the magnetic tape. The first of these is 1 if $x=1$ and 0 otherwise, the second is 1 if $x=40$ and $y=Z$, and 0 otherwise, and the third is always 1.

The computer finds the members of $D_w$ and writes the above-specified information onto the tape for $Q_{xy}$ for all $x$ from 1 to 40 and all $y$ from 1 to Z in the following order. Starting with $y=1$, work through $x=1$, $x=2$, ... $x=40$, and repeat this for $y=2$, $y=3$, ... $y=Z$.

In recognizing a character the machine (FIG. 1) reads through all the information stored in backing store 67. It is arranged by known means that when the machine recognizes any subsequent character, this information is read again from its beginning from backing store 67.

The logic box 82 carries out the following:

Sets $F_o, F_1, F_2, \ldots F_t, \ldots$ and $E_o, E_1, E_2, \ldots E_t, \ldots$ are generated as defined by the following conditions:

$i\alpha\omega \epsilon F_0$ if and only if $P_{i\psi} = P_{i\alpha}$.

$i\alpha\psi \epsilon E_o$ if and only if $P_{i\psi} \neq P_{i\alpha}$.

$i\alpha\psi \epsilon F_t$ if and only if $(i\,\alpha\psi \epsilon F_{t\,1\,1})\&(j)((j\alpha\psi \epsilon F_{t\,1\,1})v(j\alpha\psi \epsilon E_{t\,1\,1})$
$\&(\exists\gamma)((i\alpha\gamma \epsilon D_w)\&(j\alpha\gamma \epsilon C_w))\&(\exists\delta)((i\psi\delta \epsilon E_{t-1})\&$
$(j\psi\delta \epsilon F_{t-1})))$ $i\alpha\psi AgE_t$ if and only if
$(i\alpha\psi\phi F_t)\&(\exists j)((j\alpha\beta \epsilon E_0)\&(\exists\gamma)(\{j\alpha\gamma, i\alpha\gamma\} \subset D_w)\&(\exists\delta)$
$(\{j\psi\delta, i\psi\delta\} \subset F_{t-1}))$.

$F_w$ is selected as the first member of the series $F_o, F_1, \ldots F_t, \ldots F_{w\,1\,1}, F_w, \ldots$ such that $F_{w\,1\,1} = F_w$, and it is decided that the $n$-tuple is a member of the class $Q_{xy}$ if and only if $(i)(\exists\alpha)(i\alpha\psi \epsilon F_w)$.

In the above mathematics the conventional symbols of symbolic logic are used and to assist in the understanding of the above, the symbols are defined as follows:

$\epsilon$ = belongs to $\notin$ = does not belong to $\subset$ = is a member of or are members of $\exists$ = there exists $(i)$ = for all $i$, that is for all digits $(j)$ = for all digits other than the $i^{th}$. & = and $\gamma$ = or $(\exists j)$ = there is at least one digit other than the $i^{th}$ Thus the above mathematics may be written out as follows: Let $P_1, P_2, \ldots P_\alpha, \ldots P_\phi$ be the training set of patterns known to belong to $Q_{xy}$, and let P be the unknown pattern which is to be tested for membership of $Q_{xy}$. For any $\alpha$ from 1 to $\Phi$, let the N digits of pattern $P_\alpha$ be $P_{1\alpha}, P_{2\alpha} \ldots P_{i\alpha} \ldots P_{N\alpha}$. For any $\alpha$, $\beta$ in the range 1 to $\Phi$, such that $\alpha$ is not equal to $\beta$, and for any $i$ in the range 1 to N, $i\alpha\beta$ *is defined as the (nonordered) pair*

$$\{P_{i\alpha}, P_{i\beta}\}$$

and $i\alpha\psi$ is defined as the pair $$\{P_{i\alpha}, P_{i\psi}\}$$

The sets $D_o, D_1 \ldots D_t$ and $C_o, C_1, \ldots C_t \ldots$ of digit pairs are defined as follows:

$Z\alpha\beta$ belongs to the set $D_o$ if and only if the digit $P_{i\alpha}$ is the same as the digit $P_{i\beta}$ The pair $i\alpha\beta$ belongs to the set $C_o$ if and only if digit $P_{i\alpha}$ is different from the digit $P_{i\beta}$ The pair $i\alpha\beta$ belongs to the set $D_t$ if and only if $i\alpha\beta$ belongs to the set $D_{t-1}$ and if all further digit pairs of corresponding digits of the pattern $P_\alpha$ and $P_\beta$ belong to the set $D_{t-1}$ or these pairs belong to the set $C_{t-1}$ and there exist patterns $P_\gamma$ and $P_\delta$ such that the pairs formed by the other digits of the pattern $P_\alpha$ taken with corresponding digits of the pattern $P_\gamma$ and the pairs formed by the other digits of the pattern $P_\beta$ taken with the corresponding digit of the pattern $P_\delta$ are included in the set $D_{t-1}$ and the pair formed by the particular digit of the pattern $P_\alpha$ with the corresponding digit of the pattern $P_\gamma$ and the pair formed by the digit of the pattern $P_\beta$ together with the corresponding digit of the pattern $P_\delta$ both are included in the set $C_{t-1}$.

The digit pair $i\alpha\beta$ belongs to the set $C_t$ if and only if it does not belong to the set $D_t$ and there is at least one other pair of digits of the pattern $P_\alpha$ and $P_\beta$ which differ from each other and there are patterns $P_\gamma$ and $P_\delta$ such that digit pairs formed of corresponding digits of the patterns $P_\alpha$, $P_\gamma$ including the particular digit and the other digit of pattern $P_\alpha$ and digit pairs formed by corresponding digits of the patterns $P_\beta$ and $P_\gamma$ including the particular digit and the other digit of pattern $P_\beta$ are included in the set $D_{t-1}$.

Among the sets of the series starting $D_o$, $D_1$ etc. set $D_w$ is defined as the first member of the series which is such that the set $D_w$ and the set $D_{w+1}$ are the same. The set $C_w$ is defined as the set $C_t$ where $t=w$. The two other series of sets $F_o, F_1, F_2, \ldots F_t \ldots$ ; $E_1, E_2, \ldots E_t, \ldots$ are defined as follows:

The digit pair $i\alpha\psi$ is a member of the set $E_o$ if and only if the digit $P_{i\psi}$ is different from the digit $P_{i\alpha}$.

the digit pair $i\alpha\psi$ belongs to the set $F_t$ if and only if it belongs to the set $F_{t-1}$ and the pairs formed of all other corresponding digits of the patterns $P_\alpha$ and $P_\psi$ belong to the set $F_{t-1}$ or these digit pairs belong to the set $E_{t-1}$ and there exist two other patterns $P_\gamma$ and $P_\delta$ such that the pair formed of the digit of the pattern $P_\alpha$ together with the corresponding digit of the pattern $P_\gamma$ belongs to the set $D_w$ and all other digit pairs of the patterns $P_\alpha$ and $P_\gamma$ belong to the set $C_w$ and the digit pair formed by the particular digit of the pattern together with the corresponding digit of the pattern $P_\delta$ belongs to the set $E_{t-1}$ and all other pairs of corresponding digits of the patterns and belong to the set $F_{t-1}$.

The digit pair $i\alpha$ belongs to the set $E_t$ if and only if it does not belong to the set $F_t$, there exists at least one other par of corresponding digits of the pattern $P_\alpha$ and $P_\beta$ which differ and there exist patterns $P_\gamma$ and $P_\delta$ such that there are at least two corresponding pairs of digits of the patterns $P_\alpha$ and $P_\gamma$, which include the particular and the other digit of the pattern $P_\alpha$, which pairs are included in the set $D_w$ and there are at least two pairs f corresponding digits of the patterns and $P_\delta$, which include the particular and the other digits of the pattern $P_\psi$, which parts are included in the set $F_{t-1}$.

The set $F_w$ is defined as the first member of the series of sets $F_o$, $F_1$ etc., which is such that it is the same as $F_{w+1}$.

When the members of the sets $D_o, D_1, \ldots D_w$ and $C_o, C_1, \ldots C_w$ have been found, the members of the sets $F_o, F_1, \ldots F_w$ and $E_o$, $E_1$ etc. are then found and the decision as to whether the pattern $P_\psi$ is a member of $Q_{xy}$ is reached if and only if for all digits there is a pattern of which the digit pair formed by the digit of the pattern with the corresponding digit of the pattern $P_\psi$ belongs to the set $F_w$.

I claim:

1. Pattern recognition apparatus in which patterns are regarded as comprising a plurality of discrete pattern elements respectively represented by binary digital signals and an input pattern is related to patterns of known class to identify the class to which the input pattern belongs, the apparatus comprising input means for deriving from the input pattern a plurality of groups of binary digital signals, the groups respectively representing predetermined parts of the pattern, and the digital signals of a group respectively representing the pattern elements of the particular part, means for selecting the groups of digital signals in succession, storage means for storing groups of binary digital signals representing the pattern elements of the predetermined parts of patterns of known class, the other binary signals representing the relationship between the pattern elements of each part of each known pattern in each class and the pattern elements of the corresponding part of each other known pattern in the same class, the storage means producing as an output the groups of digital signals and the other signals in turn, first logical means responsive to the selecting means for comparing each digit of the selected group with the corresponding digits of each group relating to the same part as the selected group of known patterns in a single class in the output from the storage means, second logical means connected to the storage means to receive the other signals in the output from the storage means, and connected to the first logical means, to relate the results of the comparisons effected in the first logical means to the relationships, represented by the other signals, between the elements of the same part and in the same class as those with which the input pattern part is compared in digital form in the first logical means to produce the particular comparison results, and means responsive to the outputs of the second logical means to indicate the class to which the input pattern belongs.

2. Pattern recognition apparatus for ascertaining whether an input pattern $P_\psi$ belongs to a class $Q_{XY}$ of patterns to which belong patterns $P_1, P_2, P_3, \ldots, P_\alpha, \ldots, P_\phi$, the patterns being represented by groups of binary digits, in which the apparatus comprises input means for a group of digits representing $P_\psi$, storage means for storing groups of binary digits representing $P_1, P_2, P_3, \ldots P_\alpha \ldots, P_\phi$, and representations of pairs of sets $D_w$ and $C_w$, the pairs being respective to pairs of patterns $P_\alpha$ and $P_\beta (\alpha \neq \beta)$ from $P_1, P_2, \ldots P_\alpha, \ldots P_\phi$, and constructed as follows:

digit pairs $i\alpha\beta$ are produced equal to $\{P_{i\alpha}, P_{i\beta}\}$ where $P_{i\alpha}$ is the $i^{th}$ digit of pattern $P_\alpha$ and $P_{i\beta}$ is the $i^{th}$ digit of pattern $P_\beta$, the patterns all being of N digits, sets $D_o, D_1, D_2, \ldots, P_t$ and $C_o, C_1, C_2, \ldots, C_t$ are generated as defined by the following conditions:

$i\alpha\beta \epsilon D_o$ if and only if $P_{i\alpha} = P_{i\beta}$, $i\alpha\beta \epsilon C_o$ if and only if $P_{i\alpha} \neq P_{i\beta}$, $i\alpha\beta \epsilon D_t$ if and only if $(i\alpha\beta \epsilon D_{t-1})$ $(\exists j)((j\alpha\beta \epsilon D_{t+1}) v (j\alpha\beta \epsilon C_{t+1}) \& (\exists\gamma)(\exists\delta)((\{j\alpha\gamma, j\beta\delta\} \subset D_{t-1}) \& (\{i\alpha\gamma, i\beta\delta\} \subset C_{t-1}))),$ $i\alpha\beta \notin C_t$ if and only if $(i\alpha\beta \epsilon D_t) \& (\exists j)((j\alpha\beta \epsilon C_0) \& (\exists\gamma)(\exists\delta)(\{i\alpha\gamma, j\alpha\gamma, i\beta\delta, j\beta\delta\} \subset D_t))$ and the set $D_w$ is selected as the first member of the series of sets $D_o, D_1, \ldots D_t, \ldots D_{w-1}, D_w \ldots$ such that $D_{w-1} = D_w$ and the set $C_w$ is defined as the set $C_t$ for $t=w$, the storage means producing as output groups of digits and pairs of sets $D_w$ and $C_w$ in turn, comparing means connected to the storage means and to the input means for comparing the input pattern $P_\psi$ with the patterns $P_1, P_2, P_3, \ldots, P_\phi$ belonging to class $Q_{xy}$ and generating a plurality of pairs of sets $E_o$ and $F_o$, the pairs being receptive to the patterns $P_1, P_2, P_3 \ldots, P_\phi$, the sets $E_o$ and $F_o$ being defined as follows for pattern $P_\alpha$ $i\alpha\psi \epsilon F_o$ if and only if $P_{i\psi} = P_{i\alpha}$, $i\alpha\psi \epsilon E_o$ if and only if $P_{i\psi} \neq P_{i\alpha}$, wherein $P_{i\psi}$ is the $i^{th}$ digit of pattern $P_\psi$, logical means connected to the comparing means and to the storage means for relating the sets $E_o$ and $F_o$ to the sets $C_w$ and $D_w$ stored in the storage means to produce two series of sets $F_1, F_2, \ldots F_t, \ldots, F_w$ and $E_1, E_2, \ldots, E_t, \ldots, E_w$ for each of patterns $P_1, P_2, P_3, \ldots, P_\phi$, the sets being defined as follows:

$i\alpha\psi \epsilon F_t$ if and only if $(i\alpha\psi \epsilon F_{t-1}) \& (j)((j\alpha b H \epsilon F_{t-1}) v (j\alpha\psi \epsilon E_{t-1}) \& (\exists\gamma)((i\alpha\gamma \epsilon D_w) \& (j\alpha \epsilon C_w)) \& (\exists\delta)(i\psi\Delta \epsilon E_{t-1}) \& (j\psi\Delta \epsilon F_{t-1}))).$ $i\alpha\psi \epsilon E_t$ if and only if $(i\alpha\psi \notin F_t) \& (\exists j)((j\alpha\beta \epsilon E_o) \& (\exists\gamma)(\{j\alpha\gamma, i\alpha\gamma\} \subset D_w) \& (\exists\delta)(\{j\psi\delta, i\psi\delta\} \subset F_{t-1})),$ the logical means including means for selecting set $F_w$ as the first member of the series of sets $F_o, F_1, F_2, \ldots, F_w$ such that $F_{w-1} = F_w$, and output means responsive to indications of the membership of the sets $F_w$ for the patterns, $P_1, P_2, P_3 \ldots P_\phi$ from the logical means to indicate the pattern $P_\psi$ as a member of $Q_{xy}$ if and only if $(i)(\alpha)(i\alpha\psi \epsilon F_w)$.

3. Apparatus according to claim 14 in which the patterns $P_1, P_2, P_3 \ldots, P_\alpha, \ldots, P_\phi$, and $P_\psi$ are parts derived from the same region or regions of respective larger patterns, and the apparatus includes means responsive to the output means tending to indicate the pattern of which $P_\psi$ is a part, as belonging to the same class as the patterns from which $P_1$ $P_\alpha$, $\ldots P_\phi$ are derived, if $P_\psi$ belongs to $Q_{xy}$ and other parts of the pattern of which $P_\psi$ is a part belonging respectively to the classes to which corresponding parts of the patterns of which $P_1, P_2, P_3 \ldots P_\alpha \ldots P_\phi$, are parts belong.